Figure 1:
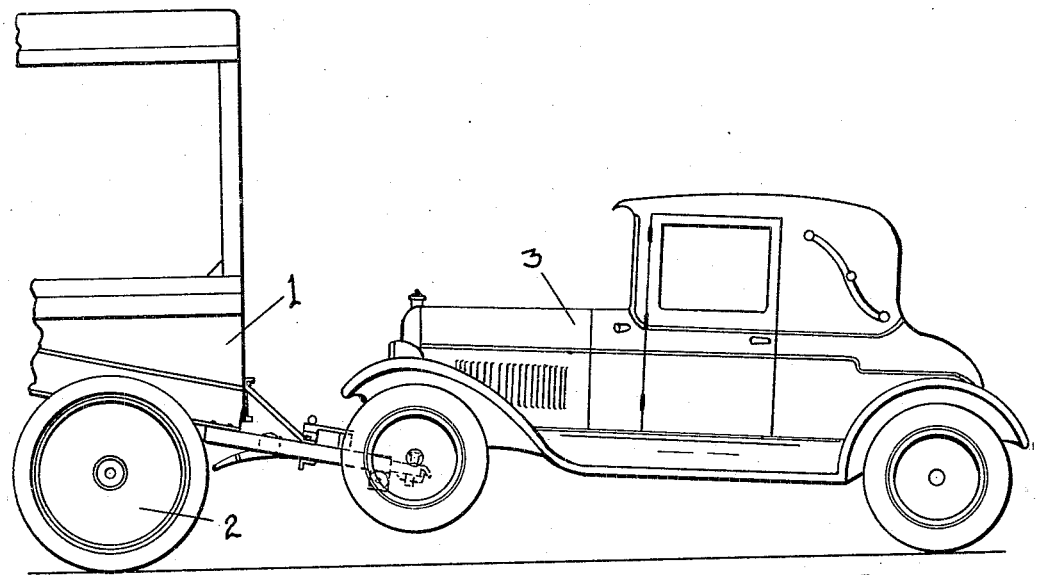

Inventor
ORION W. COWLES
By Herbert E. Smith
Attorney

March 29, 1932. O. W. COWLES 1,851,349
VEHICLE COUPLING
Filed March 24, 1931 2 Sheets-Sheet 2
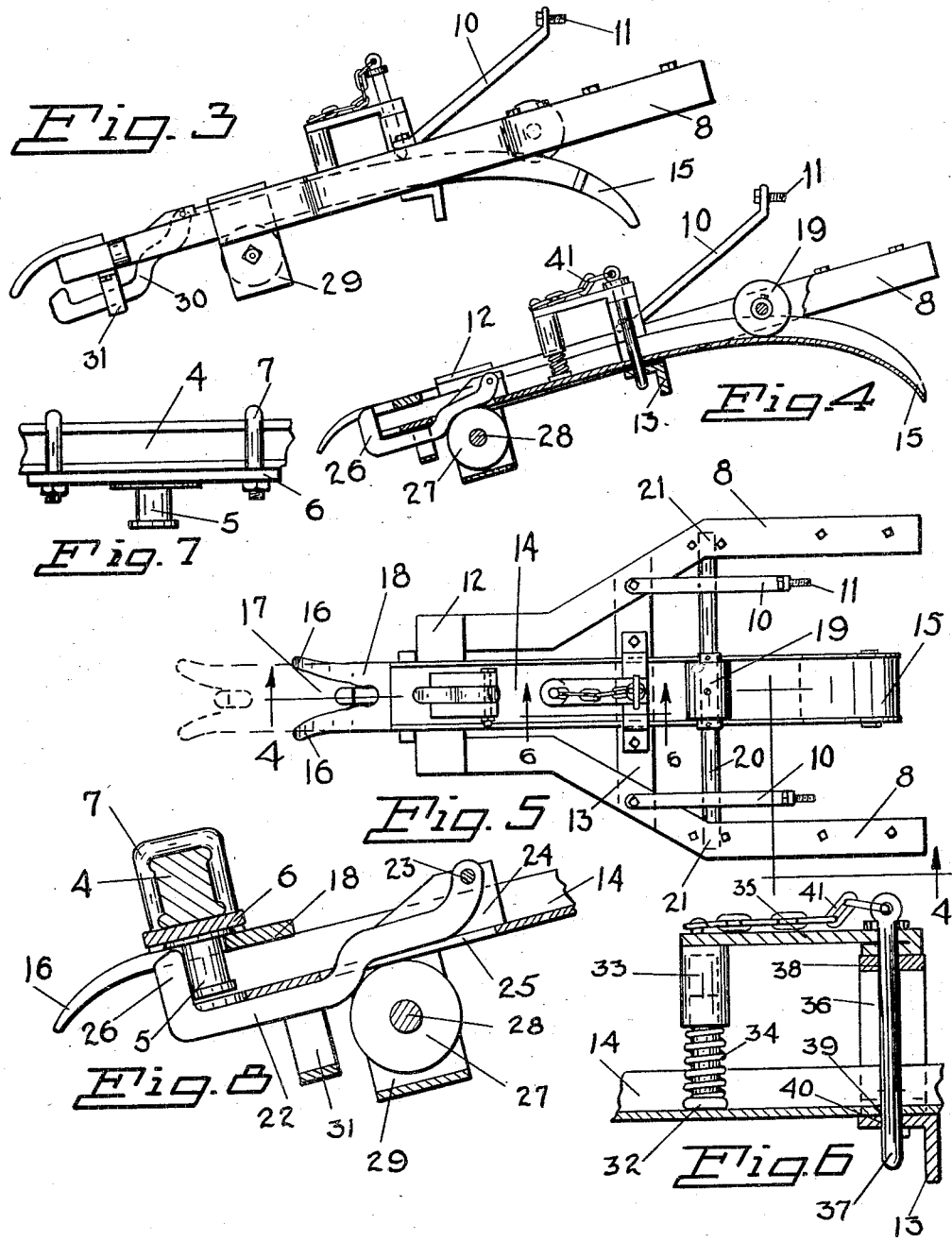
ORION W. COWLES Inventor
By *Herbert E. Smith*
Attorney Patented Mar. 29, 1932

1,851,349

UNITED STATES PATENT OFFICE

ORION W. COWLES, OF SPOKANE, WASHINGTON

VEHICLE COUPLING

Application filed March 24, 1931. Serial No. 524,836.

My present invention relates to improvements in vehicle couplings or draft appliances, adapted especially for use in coupling together two or more automotive vehicles to form an articulated train. The coupling is of the automatically operated type, and while it is capable of use in various ways, it is especially designed for the purpose of towing a vehicle or vehicles, and is permanently attached at the rear of a towing vehicle. The vehicle to be towed is also equipped with a permanent coupling head or towing stud for use with the draft appliance attached to the towing vehicle. The coupling device or draft appliance is of that type which is operated by backing the motor vehicle or towing vehicle into contact with the towed vehicle for causing the coupling action of the two vehicles, or, in some instances the vehicle to be towed may be advanced into contact with the towing vehicle to automatically cause the coupling action of the draft appliance.

As an exemplification of the utility of the draft appliance of my invention, the coupling device is here illustrated as a permanent attachment at the rear of a road grading machine of the motor operated type. In grading operations on roadways the driver of the motor operated grading machine frequently covers stretches of from five to twenty-five miles in a day's work, and at the end of the day the machine is left at the end of the graded stretch of roadway. The driver uses his passenger car in going to and coming from the grading machine, and his car is equipped with a complementary coupling stud or other device for co-action with the draft appliance on the grading machine. By the utilization of the coupling device of my invention, the passenger car is readily coupled to the grading machine at the start of the grading operated and towed by the grading machine to the end of the graded stretch of roadway, after which the passenger car is readily uncoupled from the grading machine, and employed for the return of the driver to his home.

It will be understood of course that the draft appliance may be employed in various other ways, as for instance in commercial towing, where a master motor operated vehicle is equipped with the draft appliance, and one or more vehicles forming a train, may be towed by the leading vehicle.

The invention consists in certain novel combinations and arrangements of parts as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 2:
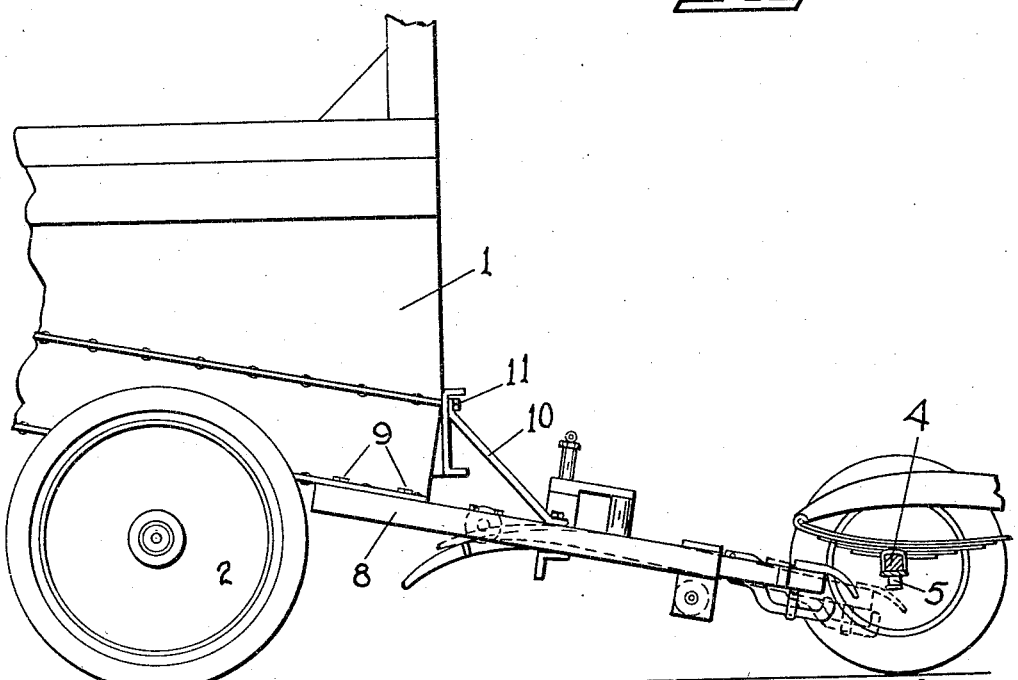

Figure 1 is a side view showing the rear portion of a grading machine and a passenger car coupled thereto by the utilization of the coupling device of my invention. Figure 2 is an enlarged view showing the grading machine equipped with the coupling device and showing also a portion of the passenger car about to couple therewith.

Figure 3 is a side view of the coupling device in position for coupling. Figure 4 is a sectional view at line 4—4 of Figure 5. Figure 5 is a top plan view of the coupling device in coupled position, and showing by dotted lines the position of the draft bar before coupling. Figure 6 is an enlarged vertical detail sectional view showing the locking device for the coupling, in locked position.

Figure 7 is a detail view at the front of the front axle of the towed car showing the coupling head or stud attached thereto for use with the draft appliance on the towing vehicle. Figure 8 is an enlarged sectional view showing the coupled parts of the device.

In order that the general assembly, relation of parts, and utility of the coupling device may readily be understood I have shown in Figures 1 and 2 the rear portion of a grading machine, or other motor operated towing vehicle, indicated at 1 with one of its rear wheels 2. The passenger car, or vehicle to be towed, is indicated as 3, and the front axle 4 of this towed vehicle is utilized for the support of the coupling head or stud 5 that is rigidly mounted at the under side of and at the center of the front axle 4. The stud or head is carried on an attaching plate 6 and the latter is secured at the underside of the axle by means of U-bolts 7.

The draft appliance which is permanently attached at the rear of the towing vehicle 1 comprises a frame which includes a pair of complementary, angular side bars 8, 8, spaced apart, and bolted at 9 to the frame 1 of the towing vehicle. A pair of braces 10 are also rigidly bolted, as at 11 to the frame 1 and the attaching frame and a rear cross bar 12 connects the two side bars. An intermediate cross bar or plate 13 is bolted at its ends to the side bars 8, 8, and these parts form a rigid frame for the draft appliance that is mounted at the rear of the towing vehicle 1.

In the frame is mounted a slidable draft bar 14, preferably of channel iron or steel, and fashioned at its forward end with a downwardly curved portion 15. The draft bar is supported longitudinally of the frame and alined with the longitudinal axis of the towing vehicle 1, the middle portion of the draft bar resting upon and slidable over the cross plate 13.

At the rear end of the draft bar are arranged a pair of outwardly flaring horns 16, 16, which form a somewhat V-shaped recess 17 in the plate 18 that is rigidly secured at the top of the channel draft bar for coaction with the coupling head 5 on the towed vehicle.

The draft bar, as indicated in Figures 2 and 5 by dotted lines, is adapted to be projected, at the rear of the frame a distance sufficient to bring the horns beneath the axle of the towed car, and as indicated in Figures 1 and 2, the draft appliance is fixed in a rearwardly declining position to the frame 1 of the car or vehicle intended as the towing vehicle.

While the draft bar is in projected position, the towing vehicle may be backed, or the vehicle to be towed may be advanced, for accomplishing the coupling together of the two vehicles.

For instance, when the car 3 is advanced, its axle 4 and coupling head 5 move toward the projected end of the draft bar and the head enters the open or flared end of the recess 17, the horns ride under the axle, and as the vehicle 3 advances the draft bar is pushed to the front, causing the front end of the car 3 to be elevated to the position of Figure 1.

The forward movement of the draft bar is retarded and stopped by the use of a brake roller 19, which in addition to guiding the movement of the draft bar, also co-acts with the downturned cam portion 15 of the bar to retard and finally stop the movement of the bar. This brake roller is mounted above the draft bar between its flanges, and is journaled on an axle 20 that is secured at its ends 21 beneath the two spaced side bars 8, 8 of the attaching frame. By its co-action with the side flanges of the channel bar, the roller prevents lateral displacement of the bar and as the cam face of the bar rides under the roller the created friction retards and finally stops the forward motion of the bar.

At the forward end of the draft bar a longitudinally disposed coupling link 22 is carried, the rear end of the link being pivoted at 23 in a bracket 24 secured at the upper face of the draft bar.

The draft bar is slotted at 25 and the front portion of the link is passed down through the slot to occupy a position beneath the draft bar and the forward end of the link terminates in an upwardly bent hook 26, which hook, when inactive, lies below the plane of the coupling head, but is elevated or pushed up in the recess 17 back of the coupling head, to effect the coupling movement. To effect this upward movement of the coupling link the latter is provided with a cam or bent portion 30 with which a coupling roller 27 co-acts to lift the hook and hold it in uplifted or coupled position behind the coupling head 5 as best seen in Figure 8.

The coupling roller 27 is journaled on a pin 28 and the latter is carried in a yoke 29 suspended from the frame 8, at its rear end and the roller as disclosed is located beneath the draft bar to aid in supporting said bar, in its reciprocating slide movement.

By a comparison of Figures 3 and 8 it will be apparent that as the projected draft bar is pushed forward from the position of Figure 3, the coupling link will ride over the coupling roller 27, and in this movement the link is lifted to the position of Figure 8 where the hook of the link is retained back of the coupling stud 5. A cross strap 31 is carried at the rear end of the draft bar, and beneath it, to limit the pivotal movement of the pivoted coupling link and prevent displacement of the link.

After the draft bar has been pushed to coupled position, it is locked to prevent longitudinal movement, but the bar is permitted to have vertical movement to a limited extent to absorb irregularities in movement between the two vehicles and to compensate for shocks and strains.

Resiliently supported means are employed for permitting shock-absorbing movement of the draft bar, comprising a spring-pressed bolt 32, located above the draft bar and adapted to impinge against its upper face of the bar. The spring pressed bolt "gives" with vertical movement of the draft bar relatively to the attaching frame 8, 8, and the bolt is adapted to reciprocate in a housing 33, between which housing and the head of the bolt a coiled spring 34 is interposed. The housing is suspended over the draft bar by means of a rigid arm 35, and the latter is secured to a rigid arch bar 36 that is bolted at its ends to the top or upper face of the angle bar 13 that joins the two side bars 8, 8.

To prevent longitudinal movement of the draft bar I employ a removable locking bolt or pin 37, which is passed through holes 38 in the arch bar and rigid arm 35, and also through alined holes at 39 and 40 in the draft bar, and cross bar 13 as best seen in Figure 6. The locking pin is provided with a safety chain 41 that may be attached to the rigid arm 33 to prevent less of the pin when it is removed, by hand, from the appliance.

In detaching or uncoupling the towed vehicle from the towing vehicle, the locking pin is first removed, and then the towing car may be advanced, or the towed car may be backed, thereby pulling the draft bar to the rear, freeing the coupling link from the roller 27, and permitting the link to drop from the coupling head 5, and continued movement of course separates the vehicles.

The usual method so far adopted of effecting a coupling is for the towed vehicle to advance upon the coupling under its own power, and where it is advisable to back the towing vehicle into the coupling connection with the towed vehicle the brake of the latter may be set or a chock placed behind the wheels to prevent backward movement during the coupling operation.

Having thus fully described my invention, what I claim as new and desire to secure by Letters Patent is:

1. The combination with an attaching frame, of a slidable draw bar, a pivoted coupling link at the rear of the draw bar and a forked coupling head mounted at the end of the draw bar for co-action with the link, means on the frame for elevating the link to coupling position, and means for locking the draw bar in coupled position.

2. The combination with an attaching frame, of a slidable draw bar, co-acting means on the frame and draw bar for braking the movement of the bar, a pivoted coupling link at the rear of the draw bar and a forked coupling head on the draw bar for co-action with the link, means on the frame for elevating the link to coupling position, and means for locking the draw bar in locked position.

3. The combination with an attaching frame, of a slidable draw bar, a pivoted coupling link at the rear of the draw bar and a forked coupling head on the draw bar for co-action with the link, a coupling roller mounted on the frame for co-action with the link for elevating the latter to coupling position, and means for locking the bar in coupled position.

4. The combination with an attaching frame, of a slidable draw bar, coupling means carried at the rear end of the bar, and co-acting means on the bar and frame for frictional engagement in braking the movement of the bar.

5. The combination with a supporting frame, of a slidable draft bar, vehicle coupling means carried at one end of the bar, resiliently supported means for limiting relative movement of the bar and frame, and means mounted on the frame for co-action with the draft bar for locking the latter in coupled position.

6. The combination with a supporting frame, of a slidable draft bar, coupling means carried at one end of the bar, a curved cam portion at the other end of the bar, and a friction roller mounted on the frame for co-action with the cam portion to retard coupling movement of the draft bar.

7. The combination with a supporting frame, of a slidable draft bar, coupling means carried on the draft bar, an arch bar on the frame, a housing supported from said arch bar, a spring pressed bolt mounted in the housing for engagement with the draft bar, and a locking pin engaging holes in the arch bar and draft bar.

8. The combination with a supporting frame, of a slidable draft bar having a forked coupling head, a hooked coupling link pivoted on the bar for co-action with said head, a coupling roller mounted on the frame for elevating the link, resiliently supported means on the frame for engagement with the bar to permit relative movement of the bar, co-acting means on the frame and bar for locking the bare in coupled position, a cam face on the bar, and a braking roller mounted on the frame for co-action with said face.

In testimony whereof I affix my signature.

ORION W. COWLES.